(12) United States Patent
Tabellini

(10) Patent No.: US 6,260,438 B1
(45) Date of Patent: Jul. 17, 2001

(54) PROTECTIVE COVER WHICH CAN BE ATTACHED TO A MACHINING PART WHICH IS MOBILE AT LEAST ACCORDING TO A PLANE

(75) Inventor: Giorgio Tabellini, Sasso Marconi (IT)

(73) Assignee: P.E.I. Protezioni Elaborazioni Industriali S.r.l., Bologna (IT)

( * ) Notice: Subject to any disclaimer, the term of this patent is extended or adjusted under 35 U.S.C. 154(b) by 0 days.

(21) Appl. No.: 09/407,927

(22) Filed: Sep. 29, 1999

(30) Foreign Application Priority Data

Sep. 30, 1998 (IT) ............................. B098A556 U

(51) Int. Cl.$^7$ .................................................. B23Q 11/08
(52) U.S. Cl. ............................. 74/612; 160/202; 409/134
(58) Field of Search ..................... 74/612, 608; 409/134; 160/202, 197, 211, 216, 222, 223

(56) References Cited

U.S. PATENT DOCUMENTS

| | | | |
|---|---|---|---|
| 3,570,578 | * 3/1971 | Loos ...................................... | 160/202 |
| 4,773,457 | * 9/1988 | Bierbrauer et al. ..................... | 74/608 |
| 5,482,414 | * 1/1996 | Hayashi et al. ....................... | 409/134 |
| 5,560,415 | * 10/1996 | Geissler ................................ | 160/220 |
| 5,704,884 | * 1/1998 | Uemura et al. ..................... | 74/608 X |
| 6,089,800 | * 7/2000 | Tabellini ............................ | 74/608 X |

FOREIGN PATENT DOCUMENTS 9-225777 * 9/1997 (JP).
11-197986 * 7/1999 (JP).

* cited by examiner

Primary Examiner—Charles A. Marmor
Assistant Examiner—Ankur Parekh
(74) Attorney, Agent, or Firm—Fay, Sharpe, Fagan, Minnich & McKee, LLP

(57) ABSTRACT

A protective cover for a zone of a machine with moving parts, in which the machine comprises a mobile machining part which moves along an operating path, preferably extending in a single plane. The protective cover comprises a first set of cover elements, which are connected to the machining part in such a way that they can move, extending away from one another so as to cover the zone and overlapping one another along a trajectory of the machining part, and a second set of cover elements, which are connected to machining part in such a way that they can move, extending away from one another so as to cover the zone and overlapping one another along a trajectory of the machining part which is different to the trajectory of the cover elements of the first set, in such a way that when the machining part moves along its operating path it draws the first and second cover means along the respective trajectory, ensuring that the zone to be covered remains covered.

26 Claims, 6 Drawing Sheets

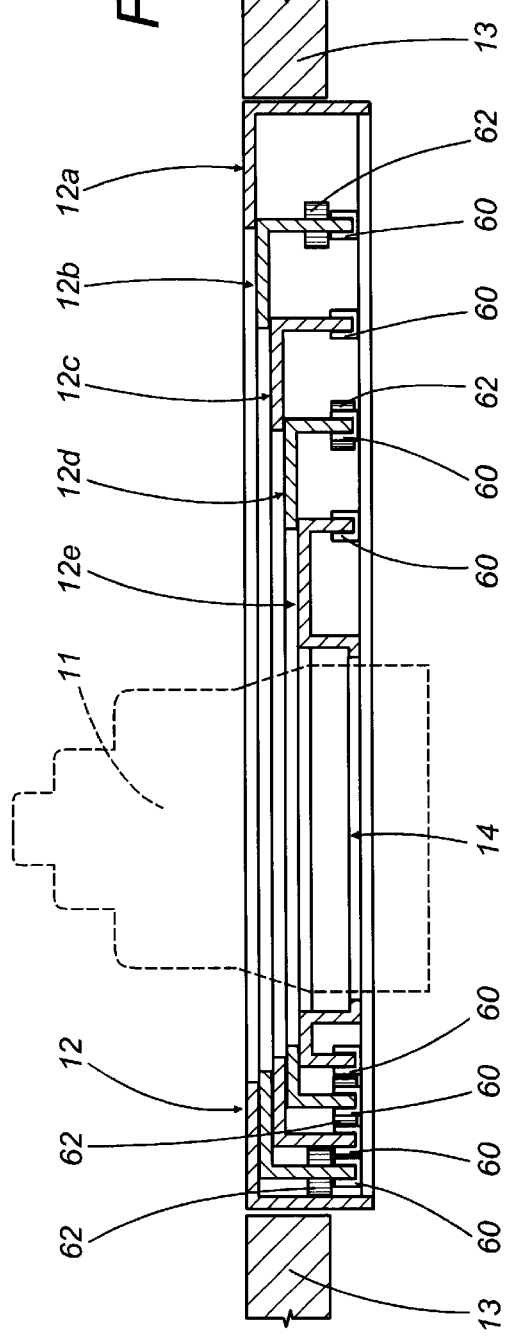
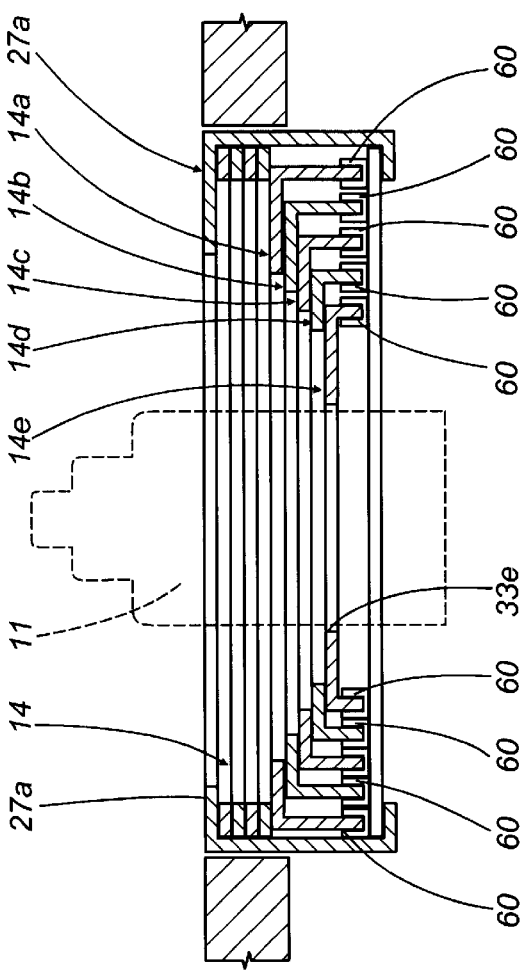
FIG. 3A
FIG. 3B

PROTECTIVE COVER WHICH CAN BE ATTACHED TO A MACHINING PART WHICH IS MOBILE AT LEAST ACCORDING TO A PLANE

BACKGROUND OF THE INVENTION

The present invention relates to a mobile protective cover for a zone of a machine with moving parts.

The present cover is, in particular, attached to a machining part or tool on the machine, which is mobile along a respective operating path, preferably extending in accordance with at least two reference co-ordinates and, in particular, extending in a single plane.

The present cover allows protection of the machine machining part or tool mobile support and drive parts which extend behind the machining part.

Machining parts usually have protective covers that move along substantially planar trajectories and that are designed to prevent contact between the machine moving parts and chippings, powders or other damaging external agents, as well as preventing the leakage of lubricating oils from the moving parts which may dirty the workpiece, and obviously preventing injury to the operator.

Said known mobile protective covers normally consist of a plurality of flat cover plates, positioned relative to one another and connected to the machine machining part, which projects from a central opening in the cover means, in such a way that they follow the machining part during its machining movements, keeping the machine moving parts covered.

The flat cover plates or elements of this known individual plurality have a disadvantage relative to the fact that they are not able to cover extensive openings or machining zones and do not allow extensive movements by the moving part or tool.

Covers are also known which extend or move in a linear fashion in a single straight direction, covering large openings and allowing extensive travel by the mobile machining part or tool. However, such linear covers are completely unsuitable for machining parts which move along trajectories other than a straight trajectory, in particular along planar trajectories.

SUMMARY OF THE INVENTION

The present invention provides a protective cover for a machine zone with moving parts with the characteristics described in claim 1. In particular, a protective cover is provided for a machine zone with moving parts, in which the machine comprises a machining part which is mobile along a respective operating path, preferably extending in a single plane, and in which the machine moving parts to be protected are behind the mobile part. The protective cover comprises cover means connected to the machine machining part in such a way that they follow the machining part operating movements, keeping the machine moving parts covered; wherein the cover means comprise, in combination, at least first cover means in the form of a first set of cover elements connected to the machining part in such a way that they can move along a defined trajectory, extending relative to one another so that they cover the zone and overlapping, and second cover means in the form of a second set of cover elements connected to the machining part in such a way that they can move, extending relative to one another so that they cover the zone and overlapping, along a trajectory different to the trajectory of the cover elements in the first set, so that as the machining part moves along its operating path, it moves the first and second cover means along the respective trajectories, ensuring that the zone to be covered remains covered.

By dividing the movement, in particular on the plane, transmitted by the moving part to the protective cover between the first and second mobile cover means on different trajectories, with the first and second cover means co-operating during the movement to ensure that the zone with the machine moving parts to be covered remains covered, advantage can be taken of the extensive travel and significant openings which can be covered by each cover means along its respective movement trajectory, providing a total cover which can be applied on very large openings or machining zones to be covered, thus allowing extensive operating movements of the moving part or tool.

The secondary claims refer to preferred and advantageous embodiments of the present invention.

BRIEF DESCRIPTION OF THE DRAWINGS

Other characteristics and technical advantages of the invention are more clearly described in the detailed description which follows, with reference to the accompanying drawings, which illustrate preferred embodiments of the invention, without limiting the scope of application and in which:

FIGS. 3A and 3B respectively illustrate a longitudinal section and a cross-section according to lines IIIA—IIIA and IIIB–IIIB in FIG. 2;

DESCRIPTION OF THE PREFERRED EMBODIMENTS

Figure 1:
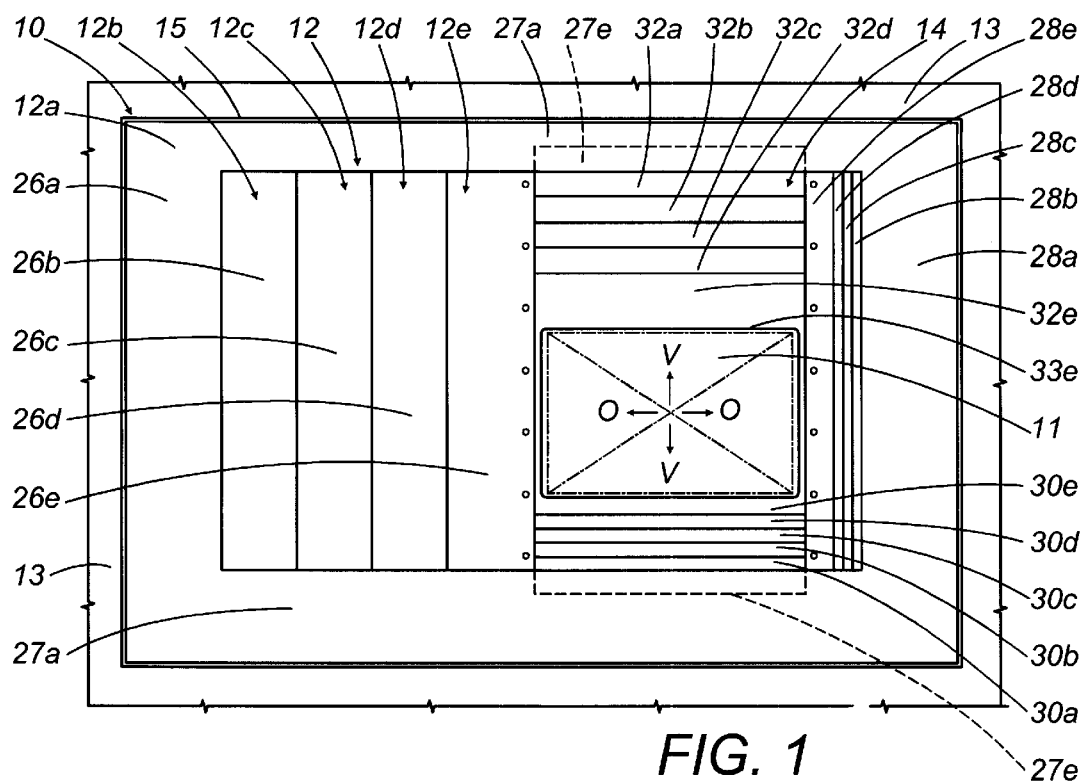
FIG. 1 is a front view of a first preferred embodiment of the cover according to the present invention, in an operating position.
Figure 2:
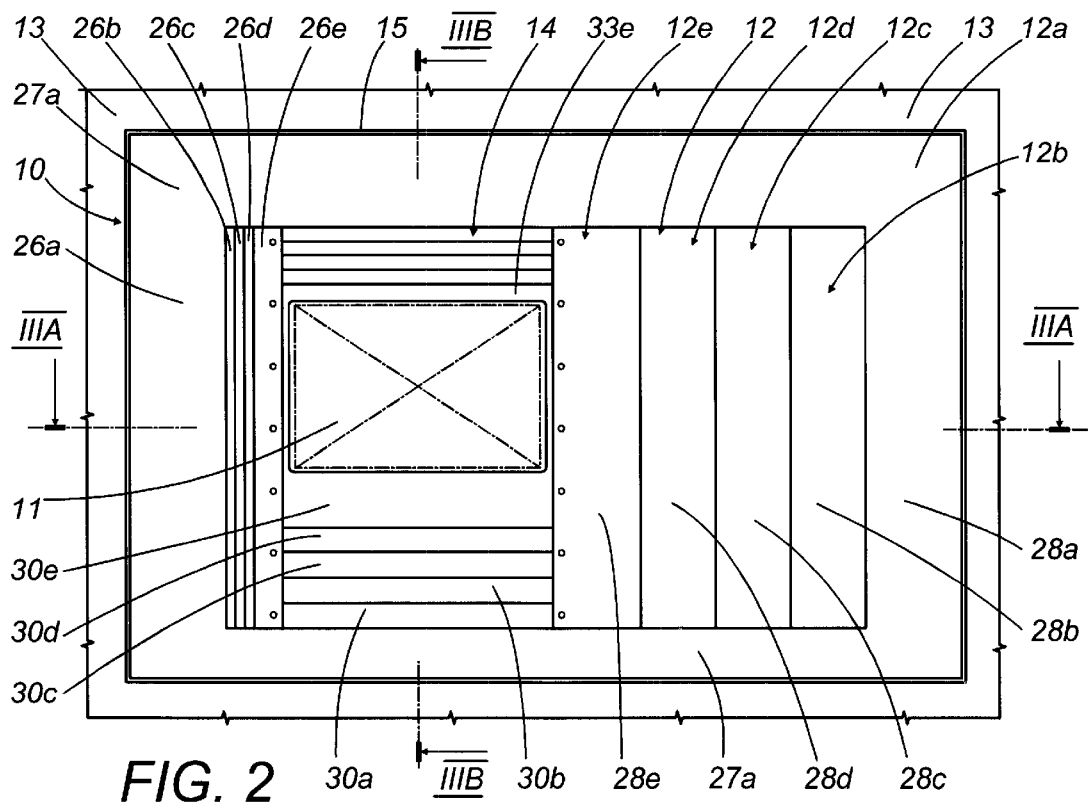
FIG. 2 is a front view of the preferred embodiment of the cover according to the present invention, in another operating position.

With reference to the accompanying drawings, the present preferred embodiment of the protective cover 10 is designed to cover the mobile support and drive parts of a workpiece machining part or tool, schematically illustrated and labeled 11 in the accompanying drawings, the machining part 11 projecting from the cover 10 and being mobile along a preset operating path which lies in a substantially vertical plane.

The moving parts to be protected which support and drive the present machine part extend, behind the moving part 11, within a zone delimited by a window 15 in the machine frame 13 (only partially illustrated in the figures), which allows the free operating movement of the machining part 11 according to the preset planar path.

The cover comprises a first set 12 of cover elements, labeled 12a, 12b, 12c, 12d, 12e, which are connected to the machining part 11 in such a way that they can move, with reciprocal bi-directional sliding contact, along a defined trajectory, in this case a horizontal trajectory indicated by the arrows O in FIG. 1. The cover elements 12a, 12b, 12c, 12d, 12e are mobile between a position in which they are extended and cover the zone in which the machine moving parts move, in which the cover elements extend relative to one another, and a retracted position, in which the cover elements overlap one another.

The present cover also comprises a second set 14 of cover elements 14a, 14b, 14c, 14d, 14e, also connected to the machining part 11 in such a way that they can move bi-directionally along a defined trajectory, in this case a vertical trajectory indicated by the arrows V in FIG. 1, at a right angle to the trajectory O of the first set 12 of cover elements. The cover elements 14a, 14b, 14c, 14d, 14e are mobile between a position in which they are extended and cover the zone in which the machine moving parts move, in which the cover elements extend relative to one another, and a retracted position, in which the cover elements overlap one another.

In accordance with an advantageous aspect of the present invention, the first and second sets 12, 14 of cover elements are arranged in such a way that, when the machining part 11 moves along its operating path, the part 11 draws the first and second cover means 12, 14 along the respective trajectory, keeping the machine moving parts covered.

The first set 12 of cover elements comprises, in particular, a fixed element 12a which connects, in any suitable way, not illustrated in the accompanying drawings, to the machine frame 13, an element 12e for connection to the machining part 11 and a plurality of mobile intermediate cover elements 12b, 12c, 12d located between the fixed cover element 12a and the cover element 12e connected to the machining part. The cover elements 12a, 12b, 12c, 12d, 12e are mobile and connected together in such a way that they constitute an overall cover which can be extended and retracted.

The second set 14 of cover elements in turn comprises a cover element fixed according to the direction of movement of the second set, a cover element 14e connected to the machining part 11 and a plurality of mobile intermediate cover elements 14a, 14b, 14c, 14d located between the fixed cover element 14a and the cover element 14e connected to the machining part. The cover elements 14a, 14b, 14c, 14d, 14e are mobile and connected together in such a way that they constitute an overall cover which can be extended and retracted.

Figure 4:
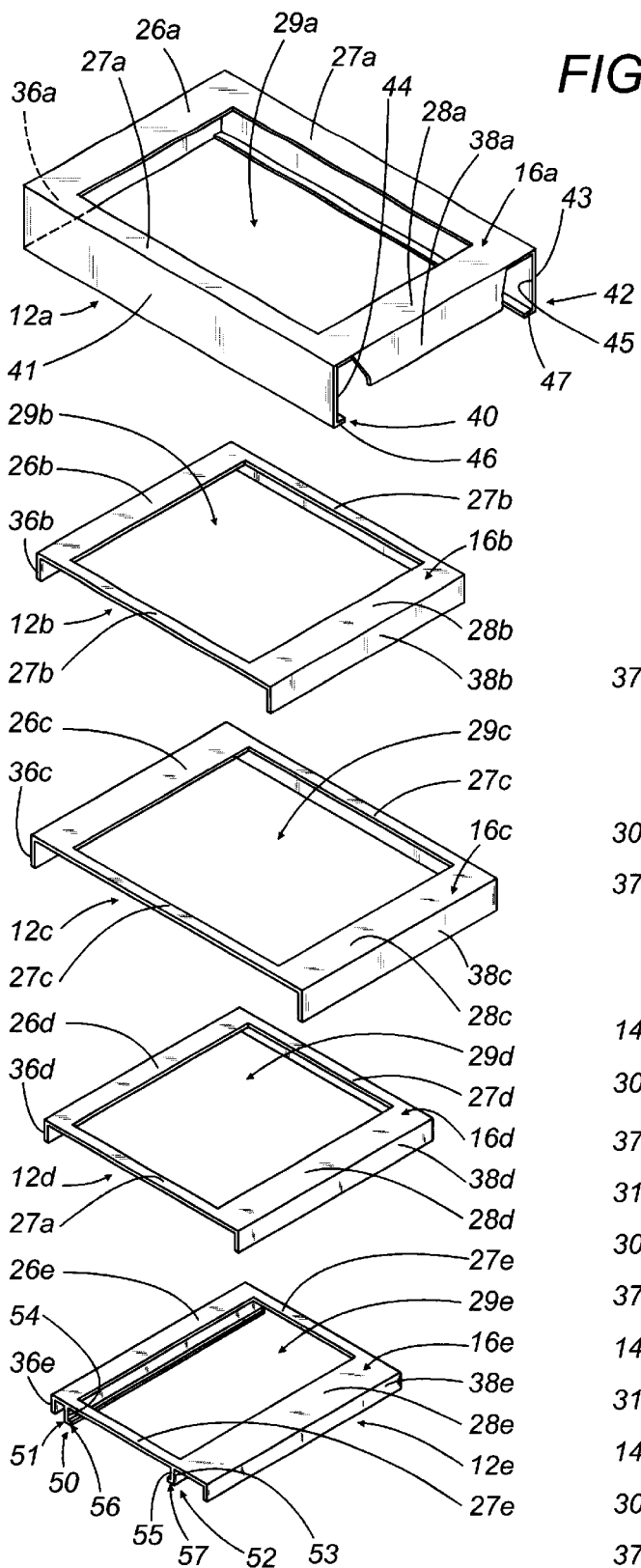
FIGS. 4 and 5 are respectively exploded perspective views of the first and second sets of cover elements which constitute the cover in accordance with the present invention.

As illustrated, particularly in FIG. 4, the cover elements 12a, 12b, 12c, 12d, 12e of the first set have decreasing lengths and each comprise a cover panel 16a, 16b, 16c, 16d, 16e with opposite plates respectively labeled 26a, 28a, 26b, 28b, 26c, 28c, 26d, 28d and 26e, 28e (connected by respective lateral longitudinal arms 27a, 27a, 27b, 27b, 27c, 27c, 27d, 27d, 27e, 27e). Between the plates there are respective openings 29a, 29b, 29c, 29d, 29e in which corresponding cover element panel plates project, the latter being smaller and arranged concentrically within the openings.

Figure 5:
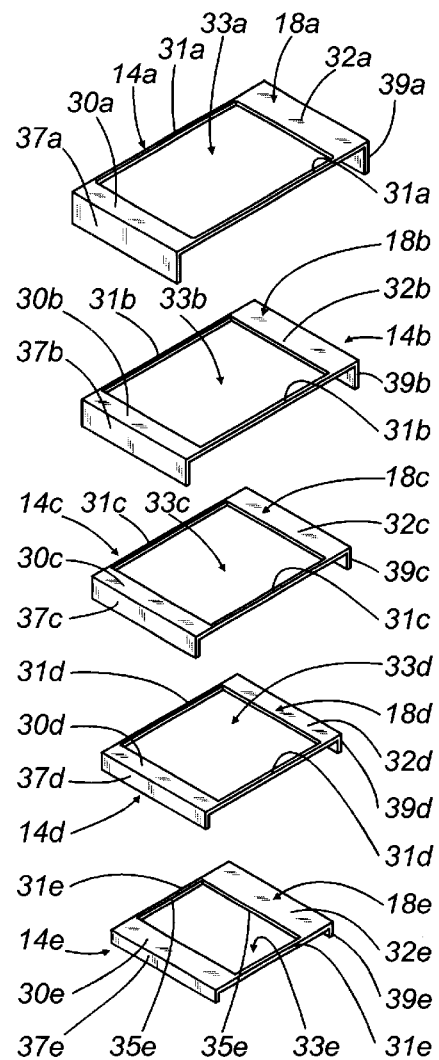

Similarly, as illustrated in particular in FIG. 5, the cover elements 14a, 14b, 14c, 14d, 14e of the second set each comprise a respective cover panel 18a, 18b, 18c, 18d, 18e with opposite plates, respectively 30a, 32a, 30b, 32b, 30c, 32c, 30d, 32d and 30e, 32e (connected by respective lateral arms 31a, 31a, 31b, 31b, 31c, 31c, 31d, 31d, 31e, 31e), between which there are openings 33a, 33b, 33c, 33d, 33e in which corresponding cover element panel plates project, the latter being smaller and arranged concentrically within the openings relative to the other cover elements.

In the embodiment illustrated, for each set of cover elements, when viewed from the outside of the machine, the cover panels 16, 18 of the outer concentric cover elements overlap the cover panels of the inner cover elements.

As illustrated, in accordance with the present preferred embodiment, the second set of cover elements 14 extends into the central opening 29a, defined between the plates 26e, 28e of the inner cover element 12e, of the first set of cover elements 12, and is connected to the first set 12 of cover elements so that it moves together with the first set of cover elements 12 along the trajectory O of the latter.

The first and second sets 12, 14 of cover elements are connected to one another thanks to the fact that the fixed element of the second set of cover elements is the inner cover element 12e of the first set, whose lateral arms 27e, 27e create the opposite cover plates of the first fixed element of the second set of cover elements 14.

However, instead of assigning the inner element 12e of the first set of cover elements 12 the function of the fixed element in the second set 14 of cover elements, a purpose-fitted fixed element of the second set 14 may be envisaged, fixed to the inner element 12e of the first set of cover elements 12.

In accordance with another advantageous aspect of the present preferred embodiment, to draw the first and second sets of cover elements along the respective trajectory, the mobile machining part 11 co-operates with the inner element 14e of the second set of cover elements, through suitable engagement means, in this case consisting of the inner edge 35e forming the opening 29e in which the machining part 11 is inserted.

Other methods of reciprocal engagement between the machining part and the inner element 14e of the second set and, if necessary, the inner element of the first set, should the latter be disconnected from the first set of cover elements, are possible.

In the present embodiment, the first and second sets 12, 14 of cover elements may be moved, preferably in succession, according to the respective directions O and V or vice versa. However, nothing prevents the first and second sets from being moved simultaneously, to follow an oblique movement by the machining part 11.

To draw them along the respective trajectory, the mobile cover elements 12b, 12c, 12d, 12e of the first set 12 comprise first engagement and drawing means 36b, 36c, 36d, 36e which, during movement, engage with matching engagement means 36b, 36c, 36d, 36e of the adjacent cover elements 12b, 12c, 12d, 12e, so as to draw the cover elements in a preset direction on the trajectory, and second engagement and drawing means 38b, 38c, 38d, 38e which, during movement, engage with matching engagement means of the adjacent cover elements 12b, 12c, 12d, 12e, so as to draw the latter in the opposite direction to the previous.

In accordance with the embodiment illustrated, for the bi-directional drawing of each cover element 12b, 12c, 12d, 12e, said engagement means on each cover element take the form of at least a first 36b, 36c, 36d, 36e and a second 38b, 38c, 38d, 38e engagement portion, projecting perpendicularly at the opposite ends of the respective cover element 12b, 12c, 12d, 12e. Similar perpendicular projections 36a, 38a at the opposite longitudinal ends of the fixed element 12a define means for stopping the travel of the cover elements.

Similarly, to draw them along the respective trajectory, the cover elements 14a, 14b, 14c, 14d, 14e of the second set 14 comprise respective first engagement and drawing means 37a, 37b, 37c, 37d, 37e which, during movement, engage with matching engagement means 37a, 37b, 37c, 37d, 37e of the adjacent cover elements 14a, 14b, 14c, 14d, 14e, so as to draw the cover elements in a preset direction on the trajectory, and second engagement and drawing means 39a, 39b, 39c, 39d, 39e which, during movement, engage with matching engagement means of the adjacent cover elements 14a, 14b, 14c, 14d, 14e, so as to draw the latter in the opposite direction to the previous.

As illustrated, in accordance with the present preferred embodiment, for the bi-directional drawing of each cover element 14a, 14b, 14c, 14d, 14e, said engagement means on each cover element take the form of at least a first 37a, 37b, 37c, 37d, 37e and a second 39a, 39b, 39c, 39d, 39e engagement portion, projecting perpendicularly at the opposite ends of the respective cover element 14a, 14b, 14c, 14d, 14e.

The stop means which stop the travel of the cover elements of the second set 14 are envisaged in the form of portions 41, 43 which project perpendicularly at the opposite transversal ends of the fixed element 12a of the first set of cover elements 12 which, as explained below, also constitute the guide means for the first set of cover elements.

The present cover has suitable guide means for advantageous cursor parts envisaged on the cover elements for the sliding engagement of the guide means. A particular advantage is the fact that the cursor parts at the ends of the cover elements in the form of wheels 62 which run on the guide means, as described below.

As illustrated, the present preferred embodiment of the cover envisages first 40, 42 and second 50, 52 guide means, designed to guide the first 12 and second 14 sets of cover elements along the respective trajectories.

The first guide means for the first set of covers 12 comprise a first and a second guide rail 40, 42, positioned opposite one another and extending from opposite longitudinal lateral edges of the fixed element 12a.

In particular, the first and second guide rails 40, 42 for the first set of cover elements are envisaged in the form of respective guide channels with portions 41, 43 which extend in a perpendicular fashion and define longitudinal sliding surfaces 44, 45 for corresponding cursor parts on the cover elements of the first set 12 at their opposite transversal ends.

As illustrated, the guide channels 40, 42 also comprise respective portions 46, 47 which extend, parallel with the cover panels of the first set, from the free perpendicular end of the longitudinal perpendicular sliding portions 41, 43, providing a perpendicular stop which holds the cursor parts within the guide channels.

The second guide means for the second set of cover elements, in the present preferred embodiment, in turn comprise respective first and second opposite guide rails 50, 52 extending from the end element 12e of the first set 12 of cover elements.

In particular, the first and second guide rails 50, 52 of the first and second set of cover elements take the form of respective guide channels with portions 51, 53 which extend perpendicularly, defining longitudinal sliding surfaces 54, 55 for corresponding cursor parts (described in further detail below) at the opposite transversal ends of the respective cover elements of the second set 14.

As illustrated, the guide channels 50, 52 also comprise respective portions 56, 57 which extend from the free perpendicular end of the longitudinal perpendicular sliding portions 51, 53, parallel with the cover panels of the second set of cover elements, providing perpendicular retaining means which hold the cursor parts within the guide channels 50, 52.

Figure 6:
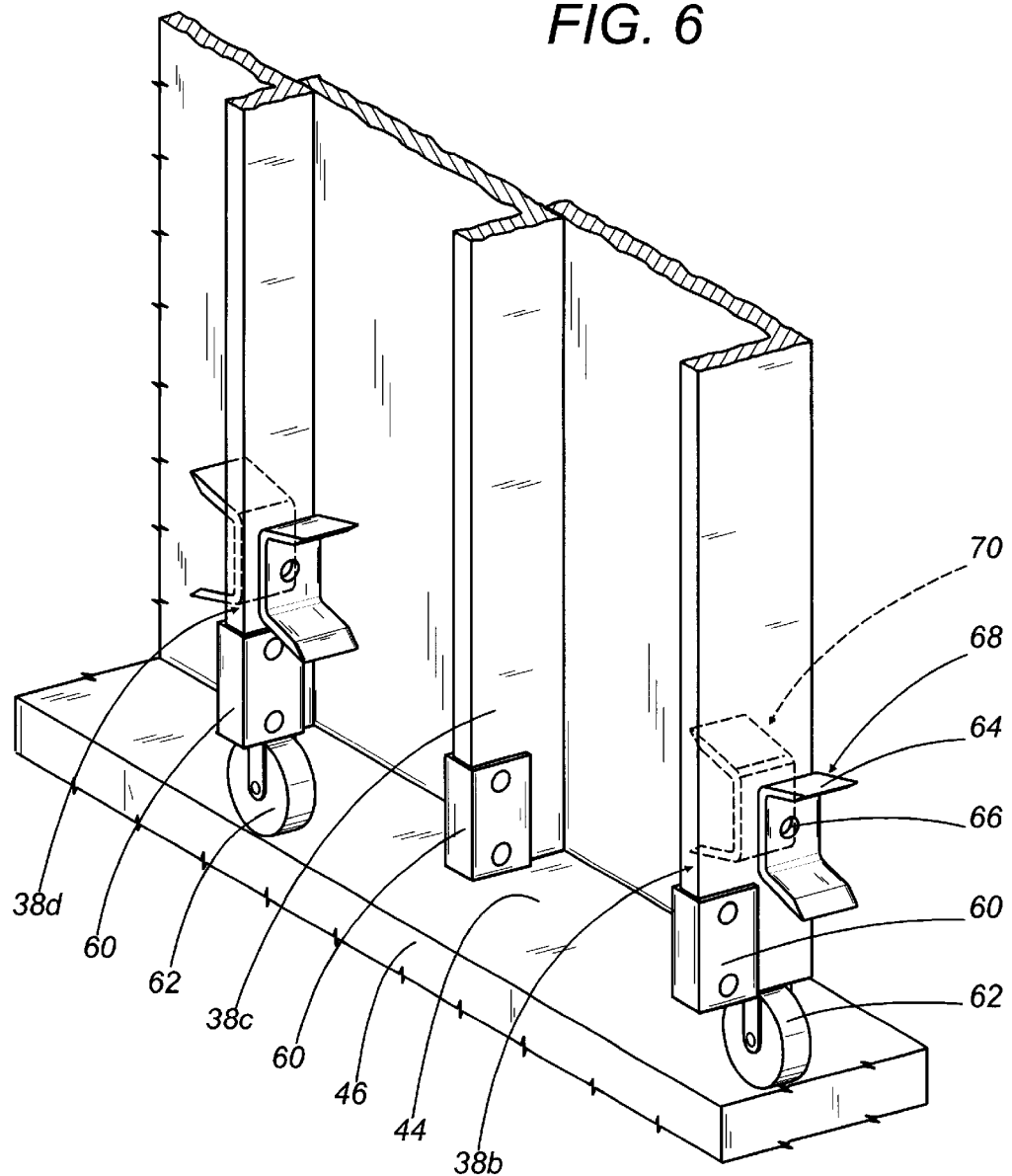
FIG. 6 is a detail illustrating the sliding parts on guides of the first preferred embodiment of the present invention.

As illustrated in particular in FIGS. 3A, 3B and 6, the cursor parts of the cover elements comprise sliding blocks 60, preferably made of brass, designed to be inserted in the corresponding guide channels. The blocks 60 are fixed, in any suitable way, to the perpendicular portions of the cover elements at the lateral ends of the latter and are inserted in the opposite guide channels.

As illustrated, the sliding blocks 60 slide in contact with the guide channel perpendicular stop or retaining portion, in such a way as to prevent perpendicular oscillations of the sliding ends of the cover elements within the guide channels.

As illustrated particularly in FIG. 6, the wheels 62, representing another embodiment of the sliding cursors of the cover elements, engage in such a way that they can rotate on the perpendicular sliding surface 44 of the guide rails 40 on the side of the elements 12 of the first set designed to remain, during use, in a lower, vertical support position.

As illustrated, the wheels 62 are preferably envisaged only on the lower side of the elements 12 of the first set, designed to remain, during use, in a lower, vertical support position.

However, it would also be possible to mount wheels 62 on all lateral ends which engage with the guides of all of the cover elements of the first and second sets of cover elements.

As can be seen in the accompanying drawings, the wheels 62 are not envisaged on all perpendicular portions of the cover elements. Instead, the wheels are envisaged only on some perpendicular portions of the cover elements and, in particular, a wheel is mounted on a perpendicular portion of a cover element, but not those adjacent to it.

As illustrated in FIG. 6, the perpendicular portions of the cover elements are fitted with elastomeric damper parts (only one of which is labeled 64 in FIG. 6) which snap into preformed holes (only one of which is labeled 66 in FIG. 6) in the perpendicular portions. The damper parts have pairs of opposite projecting portions (labeled 68, 70) which extend—giving the single part an overall "X" shape—towards the perpendicular portions of the adjacent cover elements, providing a "soft" noiseless contact with the perpendicular portions.

Figure 7:
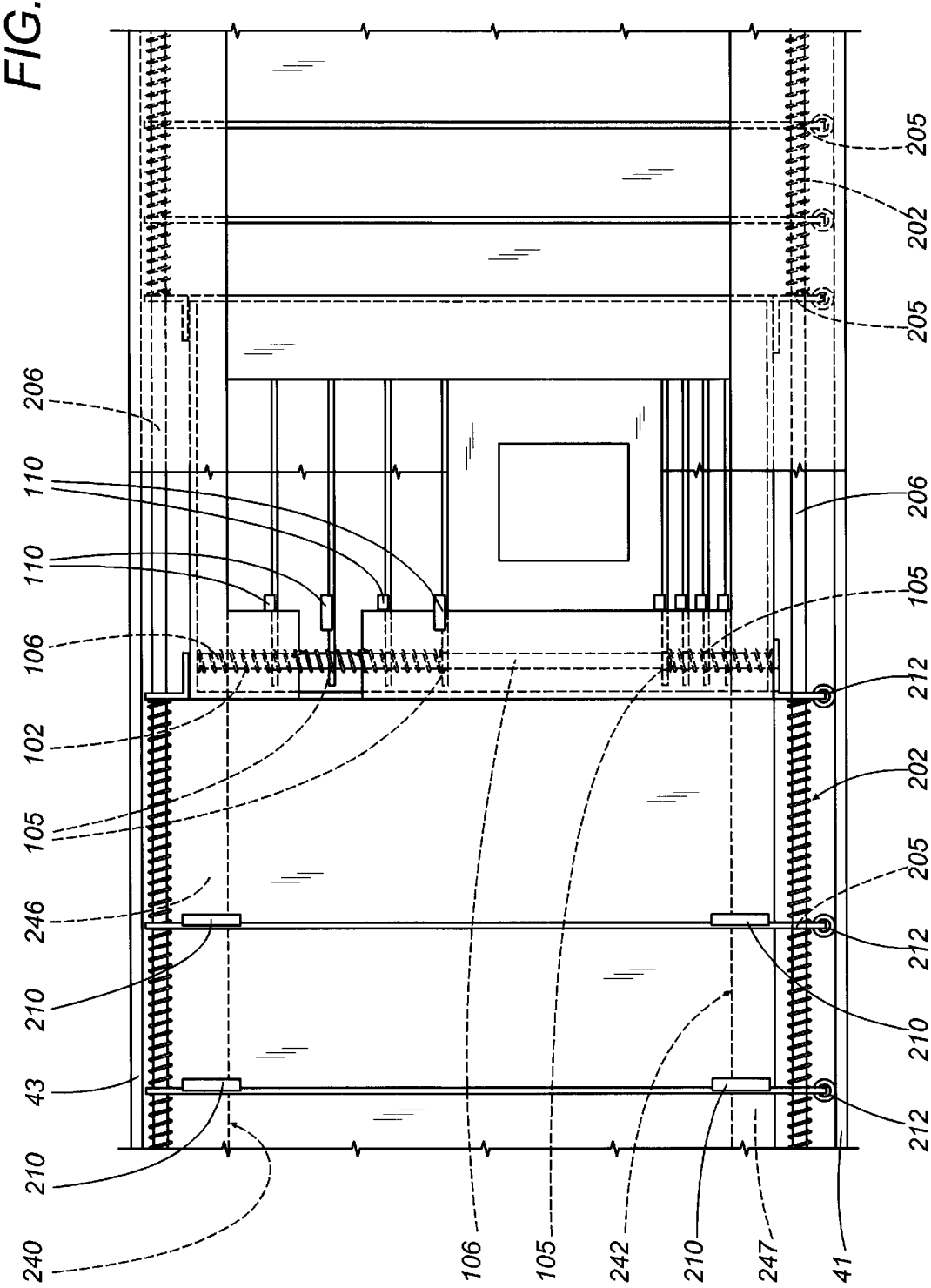
FIGS. 7 and 8 are partial rear views of a second preferred embodiment of the cover in accordance with the present invention.
Figure 8:
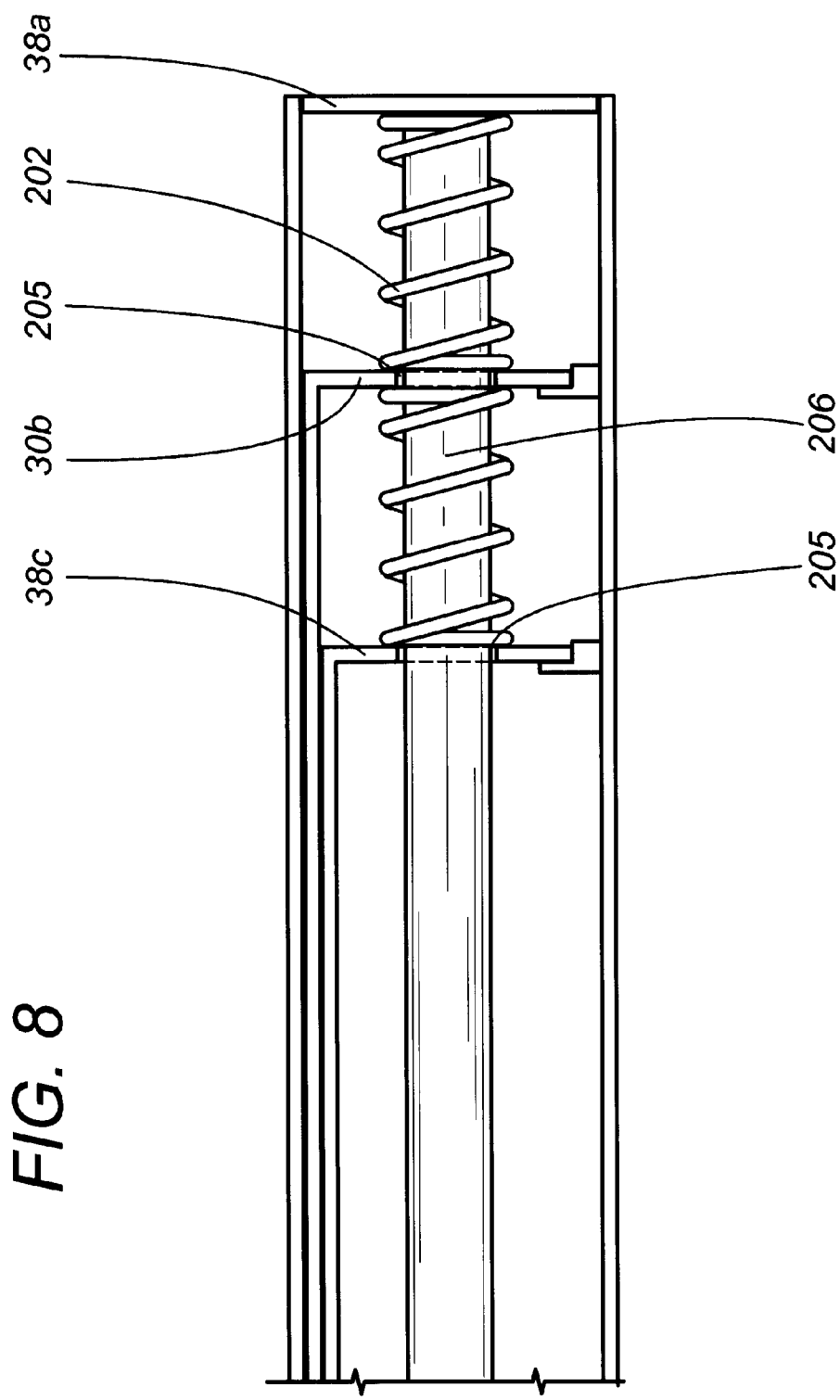

FIGS. 7 and 8 illustrate a second preferred embodiment of the present cover. The present second cover is substantially similar to the first preferred embodiment and, to shorten the present text, the parts of the second embodiment similar to those of the first embodiment are not described again in detail and retain the same numeric references.

The present second embodiment differs from the first in the fact that it comprises damper means in the form of cylindrical, helical springs 102, mounted coaxially on at least one rod 106, and preferably on two rods positioned symmetrically relative to the central hole 33e, supported by the cover element 12e outside the guides 50, 52, to dampen the contact between the transversal contact and thrust walls of the second set of cover elements 14.

As illustrated in FIG. 7, the rod 106 or rods which support the damper elements extend through holes 105 in the perpendicular walls 37a, 39a, 37b, 39b, 37c, 39c, 37d, 39d, 37e and 39e of the cover elements of the set 14, positioning the damper springs 102 between the perpendicular engagement and drawing walls.

Similarly, a first and second lateral rod 206, 206 are envisaged for the set of cover elements 12, designed to support, coaxially, damper means in the form of cylindrical, helical springs 202 which dampen the contact between the perpendicular contact and thrust walls of the first set of cover elements 12.

The spring support rods 206 extend through holes 205 in the perpendicular walls 36a, 38a, 36b, 38b, 36c, 38c, 36d, 38d, 36e, 38e of the first set of cover elements, positioning the damper springs between the perpendicular walls.

As illustrated in FIG. 7, in the second preferred embodiment, the guides 240, 242 for the first set 12 of cover elements have retaining portions 246, 247 which are larger than in the previous embodiment, so that the brass sliding blocks 210 engaged on the retaining portions 246, 247 can be envisaged at a given distance from the lateral edges and, therefore, the support rods 206 for the elastic elements can be housed in a position between the sliding blocks 210 and the longitudinal walls 41, 43 of the first cover element 12a of the first set.

In FIG. 7, the numeral 212 indicates wheels similar to those in the first preferred embodiment, and 110 indicates brass sliding blocks on the guides of the second set 14 of cover elements.

Alternatively, elastomeric rings mounted coaxially on the relative rods 106, 206 could be used instead of the steel helical springs.

The invention described can be subject to modifications and variations without thereby departing from the scope of the inventive concept. Moreover, all the details of the invention may be substituted by technically equivalent elements.

What is claimed is:

1. A protective cover for a zone of a machine with moving parts, in which the machine comprises a machining part which is mobile along a respective operating path, preferably extending in a single plane, and in which the machine moving parts to be protected are behind the mobile part; the protective cover comprising cover means connected to the machine machining part in such a way that they follow the movements of the machining part, keeping the machine moving parts covered; wherein the cover means comprise, in combination, at least first cover means in the form of a first set of cover elements, being connected to the machining part in such a way that they can move along a defined trajectory, extending relative to one another so as to cover said zone and overlapping one another, said first set of cover elements comprising a fixed end element; and second cover means in the form of a second set of cover elements, being connected to the machining part in such a way that they can move, extending relative to one another so as to cover said zone and overlapping one another, along a trajectory different to the trajectory of the first set of cover elements, in such a way that when the machining part moves along its operating path, it moves the first and second cover means along the respective trajectories, ensuring that the zone to be covered remains covered; the first and second sets of cover element comprising first and second guide means designed for guiding the first and second sets of cover elements along the respective trajectories, said first guide means comprising a first and a second guide rail, extending from the fixed element at its opposite longitudinal lateral edges.

2. The cover according to claim 1, wherein the first set and second set of cover elements are mobile in directions which are at right angles to one another.

3. The cover according to claim 1, wherein the first and second cover means are designed to be drawn by the machining part simultaneously and/or in succession.

4. The cover according to claim 1, wherein the first set of cover elements further comprises a mobile end element connected to the machining part, allowing the first cover means to be drawn along the respective movement trajectory, there being, if necessary, between the fixed end element and the connecting element, one or more mobile intermediate cover elements; and wherein the cover elements of the first set of cover elements have cover panels, each having a first and a second opposite plate in the direction of movement of the cover elements of the first set, there being openings between the plates, and wherein the cover elements are arranged in order of decreasing size, from the fixed element to the connecting element, being concentric with one another in such a way that, in all operating positions, at least one or part of both of the opposite plates of each of the cover elements projects from the opening of the cover element concentrically outside it, thus covering the zone.

5. The cover according to claim 1, wherein the second set of cover elements comprises a fixed end element, a mobile end element, the latter being connected to the machining part, allowing the second cover means to be drawn along the respective movement trajectory, and, if necessary, one or more mobile intermediate cover elements between the fixed end element and the connecting element; and wherein the cover elements of the second set of cover elements have cover panels, each having a first and a second opposite plate in the direction of movement of the cover elements of the second set, there being openings between the plates, and wherein the cover elements are arranged in order of decreasing size, from the fixed element to the connecting element, being concentric with one another in such a way that, in all operating positions, at least one or part of both of the opposite plates of each of the cover elements projects from the opening of the cover element concentrically outside it, thus covering the zone.

6. The cover according to claim 5, wherein each set of cover elements defines a respective mobile central opening, being designed to house or allow the passage of at least the machining part.

7. The cover according to claim 6, wherein for each set of cover elements, seen from the outside of the machine, the cover panels of the outer concentric cover elements overlap the cover panels of the inner cover elements.

8. The cover according to claim 4, wherein the second set of cover elements extends within the central opening of the first set of cover elements, moving together with the latter along the movement trajectory of the first set.

9. The cover according to claim 5, wherein the fixed element of the second set of cover elements is defined by, or fixed to, an inner element of the first set.

10. The cover according to claim 4, wherein the mobile machining part cooperates with the mobile end element of the second set of cover elements, allowing the first and second sets of cover elements to be drawn along the respective trajectory.

11. The cover according to claim 4, wherein for drawing along the respective trajectory, the cover elements of the first set comprise first engagement and drawing means, the latter connecting, during movement, with corresponding engagement means of adjacent cover elements, thus drawing the cover elements i a preset direction on the trajectory, and second engagement and drawing means, the latter connecting, during movement, with corresponding engagement means of adjacent cover elements, thus drawing the latter in the opposite direction to the previous.

12. The cover according to claim 11, wherein for the bi-directional drawing of each cover element, said engagement means on each cover element take the form of at least a first and a second engagement portion, projecting perpendicularly and at the opposite ends of the respective cover element.

13. The cover according to claim 4, wherein means for stopping the travel of the cover elements are provided, being in the form of portions which project perpendicularly, at the opposite longitudinal ends of the fixed element of the first set of cover elements.

14. The cover according to claim 5, wherein for drawing along the respective trajectory, the cover elements of the second set comprise first engagement and drawing means, the latter connecting, during movement, with corresponding engagement means of adjacent cover elements, thus drawing the cover elements in a preset direction on the trajectory, and second engagement and drawing means, the latter connecting, during movement, with corresponding engagement means of adjacent cover elements, thus drawing the latter in the opposite direction to the previous.

15. The cover according to claim 14, wherein for the bi-directional drawing of each cover element, said engagement means on each cover element take the form of at least a first and a second engagement portion, projecting perpendicularly at the opposite ends of the respective cover element.

16. The cover according to claim 5, wherein means for stopping the travel of the cover elements of the second set are provided, being in the form of portions which project perpendicularly, at the opposite transversal ends of the fixed element of the first set of cover elements.

17. The cover according to claim 1, where cursor parts are provided on the cover elements, allowing the rolling engagement of said guide means, wherein the cursor parts comprise wheels which run on the guide means.

18. The cover according to claim 1, wherein the second guide means for the second set of cover elements comprises a first and a second guide rail, extending from an end element of the first set of cover elements, which connects with the machining part.

19. The cover according to claim 1, wherein the first and second guide rails of the first and second sets of cover elements take the form of a guide channel, having a perpendicular portion which defines a sliding surface for corresponding cursor parts on the opposite transversal ends of the cover elements, and a perpendicular retaining portion which holds the cursor parts within the guides.

20. The cover according to claim 19, wherein the cursor parts of the cover elements comprise sliding blocks which can be inserted in the guide channel.

21. The cover according to claim 20, wherein the sliding blocks slide in contact with the perpendicular retaining portion of the guide channels.

22. The cover according to claim 19, wherein the cursor parts take the form of wheels, engaging on the perpendicular portion of the guide channel.

23. The cover according to claim 22, wherein the wheels are provided on alternate cover elements and not on the elements adjacent to these.

24. The cover according to claim 23, in which the cover elements of the first set are designed to move in a substantially horizontal direction; wherein the wheels are provided on the elements of the first set, being on the side of the elements of the first set which is designed to remain, during use, in a lower, vertical support position.

25. The cover according to claim 24, wherein means which dampen the contact are provided between the cover element projecting engagement portions used for drawing.

26. The cover according to claim 1, comprising means for dampening the contact between the cover elements of at least the first or second set, the damper means being supported by respective rods, extending in the directions of movement of the respective first and second sets of cover elements.

* * * * *